(12) United States Patent
Ohashi et al.

(10) Patent No.: US 11,135,674 B2
(45) Date of Patent: Oct. 5, 2021

(54) FRICTION STIR SPOT WELDING METHOD AND FRICTION STIR SPOT WELDING DEVICE

(71) Applicant: KAWASAKI JUKOGYO KABUSHIKI KAISHA, Kobe (JP)

(72) Inventors: Ryoji Ohashi, Kobe (JP); Yoshitaka Muramatsu, Akashi (JP); Masahiro Miyake, Kobe (JP); Takuya Fukuda, Kakogawa (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 354 days.

(21) Appl. No.: 16/313,785

(22) PCT Filed: Jun. 26, 2017

(86) PCT No.: PCT/JP2017/023392
§ 371 (c)(1),
(2) Date: Dec. 27, 2018

(87) PCT Pub. No.: WO2018/003740
PCT Pub. Date: Jan. 4, 2018

(65) Prior Publication Data
US 2019/0314927 A1    Oct. 17, 2019

(30) Foreign Application Priority Data

Jun. 27, 2016    (JP) .............................. JP2016-126342

(51) Int. Cl.
*B23K 20/00* (2006.01)
*B23K 20/12* (2006.01)
(Continued)

(52) U.S. Cl.
CPC ...... *B23K 20/1275* (2013.01); *B23K 20/1235* (2013.01); *B23K 20/1245* (2013.01);
(Continued)

(58) Field of Classification Search
CPC  B23K 20/123; B23K 20/1255; B23K 20/125; B23K 20/122; B23K 20/126; B23K 20/127; B23K 20/1275
See application file for complete search history.

(56) References Cited

U.S. PATENT DOCUMENTS

2013/0112736 A1*  5/2013  Kato .................. B23K 20/1265
                                                              228/112.1
2015/0007912 A1   1/2015  Fujii et al.
2016/0221117 A1   8/2016  Taniguchi et al.

FOREIGN PATENT DOCUMENTS

CN        104204233 A       12/2014
CN        105579183 A       5/2016
(Continued)

*Primary Examiner* — Erin B Saad
(74) *Attorney, Agent, or Firm* — Oliff PLC

(57) ABSTRACT

A method of performing friction stir spot welding of a plurality of steel plates, includes the steps of: friction stirring a spot welding portion of the plurality of steel plates by pressing a tool against the spot welding portion while rotating the tool, to plasticize the spot welding portion by friction heat; cooling the spot welding portion to cause martensitic transformation to occur in the spot welding portion, after the step of friction stirring the spot welding portion; and tempering the spot welding portion by the friction heat by re-pressing the tool against the spot welding portion while rotating the tool, after the step of cooling the spot welding portion.

8 Claims, 11 Drawing Sheets

(51) Int. Cl.
*C21D 1/18* (2006.01)
*C21D 1/34* (2006.01)
*C21D 9/50* (2006.01)

(52) U.S. Cl.
CPC ............... *C21D 1/18* (2013.01); *C21D 1/34* (2013.01); *C21D 9/50* (2013.01); *B23K 20/1255* (2013.01); *B23K 20/1265* (2013.01)

(56) References Cited

FOREIGN PATENT DOCUMENTS

EP 2653258 A1 10/2013
JP 2011-115842 A 6/2011

* cited by examiner

Cooling step S72

FRICTION STIR SPOT WELDING METHOD AND FRICTION STIR SPOT WELDING DEVICE

TECHNICAL FIELD

The present invention relates to a method and device for friction stir spot welding.

BACKGROUND ART

In some cases, a joint is manufactured by performing friction stir spot welding of a plurality of steel plates which are lapped to each other. During friction stirring, the temperature of a spot welding portion of the steel plates is raised to a temperature at which austenitic transformation occurs by friction heat. When a tool is pulled out (drawn out) of the steel plates, the temperature of the spot welding portion is decreased. If martensitic transformation occurs while the temperature is decreased, the spot welding portion is cured (hardened) and becomes brittle. This results in reduced joint strength.

Patent Literature 1 discloses that in a case where the temperature of the spot welding portion (portion to be welded) is increased up to a temperature that is equal to or higher than A3 transformation point, the rotational speed of the tool is reduced in a state in which the tool is inserted into a base metal, and the portion to be welded is gradually cooled. In a case where the temperature of the portion to be welded is decreased to A1 transformation point, the tool is pulled out (drawn out), and the portion to be welded is naturally cooled. By using this method, cooling is performed slowly to suppress formation of the martensite and suppress reduction of the joint strength.

CITATION LIST

Patent Literature

Patent Literature 1: Japanese-Laid Open Patent Application Publication No. 2011-115842

SUMMARY OF INVENTION

Technical Problem

In a case where the steel plates have a high hardenability, long cooling time is required to prevent formation of the martensite. For example, in a case where the base metal is medium-high carbon steel or alloy steel, it is necessary to take several minutes to return the temperature of the spot welding portion, from the A3 transformation point to a room temperature, in order to prevent formation of the martensite.

Therefore, the above-described method has a drawback of productivity. To improve the productivity, it is necessary to reduce the cooling time. However, in this case, the formation of the martensite cannot be suppressed. Therefore, it is difficult to keep high joint strength.

An object of the present invention is to improve joint strength and productivity in a case where friction stir spot welding of steel plates is performed.

Solution to Problem

To solve the above-described problem, according to the present invention, there is provided a method of performing friction stir spot welding of a plurality of steel plates, the method comprising the steps of: friction stirring a spot welding portion of the plurality of steel plates by pressing a tool against the spot welding portion while rotating the tool, to plasticize the spot welding portion by friction heat; cooling the spot welding portion to cause martensitic transformation to occur in the spot welding portion, after the step of friction stirring the spot welding portion; and tempering the spot welding portion by the friction heat by re-pressing the tool against the spot welding portion while rotating the tool, after the step of cooling the spot welding portion.

In the description, the term "spot welding portion" is used to indicate a portion for which the friction stir spot welding is to be performed, a portion for which the friction stir spot welding is being performed, or a portion for which the friction stir spot welding has been performed, without distinguishing these portions from each other.

In accordance with this method, after the spot welding portion has been plasticized by the friction heat, the spot welding portion is quenched (hardened) by the cooling, and then tempered by use of the tool. This makes it possible to realize reduction of hardness and high toughness of the spot welding portion, and improve the joint strength.

Although the tempering step is required, the tool used in the friction stirring step is used in the tempering step. Therefore, the steps from the friction stirring step to the tempering step can proceed smoothly in turn. As a result, productivity of the joint can be increased.

In the step of cooling the spot welding portion, the spot welding portion may be cooled at a cooling rate which is equal to or higher than an upper critical cooling rate of the plurality of steel plates.

In accordance with this method, the martensite can be stably formed in the spot welding portion, and high joint strength can be kept. In addition, cooling time is reduced, and the productivity of the joint can be improved.

In the step of cooling the spot welding portion, a temperature of the spot welding portion may be decreased to a temperature which is equal to or lower than a martensitic transformation completion temperature of the plurality of steel plates.

In accordance with this method, the martensite can be stably formed in the spot welding portion, and high joint strength can be kept.

The step of cooling the spot welding portion may include pulling up the tool to form a space between the tool and the spot welding portion, and the tool may be pulled up so that a pull-up amount of the tool is less than a pin hole depth.

In accordance with this method, a position deviation (position gap) between the tool and the pin hole can be suppressed. Therefore, it becomes possible to prevent a situation in which the tool undesirably interferes with the steel plate while the tool is re-pressed against the spot welding portion in the tempering step. As a result, break of the tool can be prevented.

In the step of tempering the spot welding portion, a temperature of the spot welding portion may be increased up to 550 to 650 degrees C. and then decreased.

In accordance with this method, since the spot welding portion is tempered at a high temperature, it becomes possible to suitably realize reduction of hardness and high toughness of the spot welding portion.

In the step of tempering the spot welding portion, a rotational speed of the tool may be set to be higher than a rotational speed of the tool in the step of friction stirring the spot welding portion.

In accordance with this method, the speed of re-heating in the tempering step is increased, and time required for the tempering step can be reduced.

The plurality of steel plates may have a carbon content of 0.06% or more, or a tensile strength of 590 MPa or higher.

By performing the above method, it becomes possible to realize reduction of hardness and high toughness of the spot welding portion, and improve the joint strength. This is advantageous.

According to another aspect of the present invention, there is provided a device for performing friction stir spot welding of a plurality of steel plates, the device comprising: a displacement driving unit which displaces a spot welding portion of the plurality of steel plates and a tool relative to each other; a rotation driving unit which rotates the tool; and a control unit, wherein the control unit performs a friction stirring step, in which the control unit causes the displacement driving unit and the rotation driving unit to operate to press the tool against the spot welding portion while rotating the tool, to plasticize the spot welding portion by friction heat, wherein the control unit performs a cooling step for cooling the spot welding portion, in which the control unit causes at least one of the displacement driving unit and the rotation driving unit to operate, to pull up the tool and/or reduce a rotational speed of the tool, and the control unit performs a tempering step for tempering the spot welding portion, in which the control unit causes the displacement driving unit and the rotation driving unit to operate to re-press the tool against the spot welding portion while rotating the tool.

Advantageous Effects of Invention

In accordance with the present invention, it becomes possible to improve joint strength and productivity in a case where friction stir spot welding of steel plates is performed.

DESCRIPTION OF EMBODIMENTS

Hereinafter, the embodiments will be described with reference to the drawings. Throughout the drawings, the same or corresponding constituents are designated by the same reference symbols and will not be described in detail repeatedly.

Embodiment 1

Figure 1:
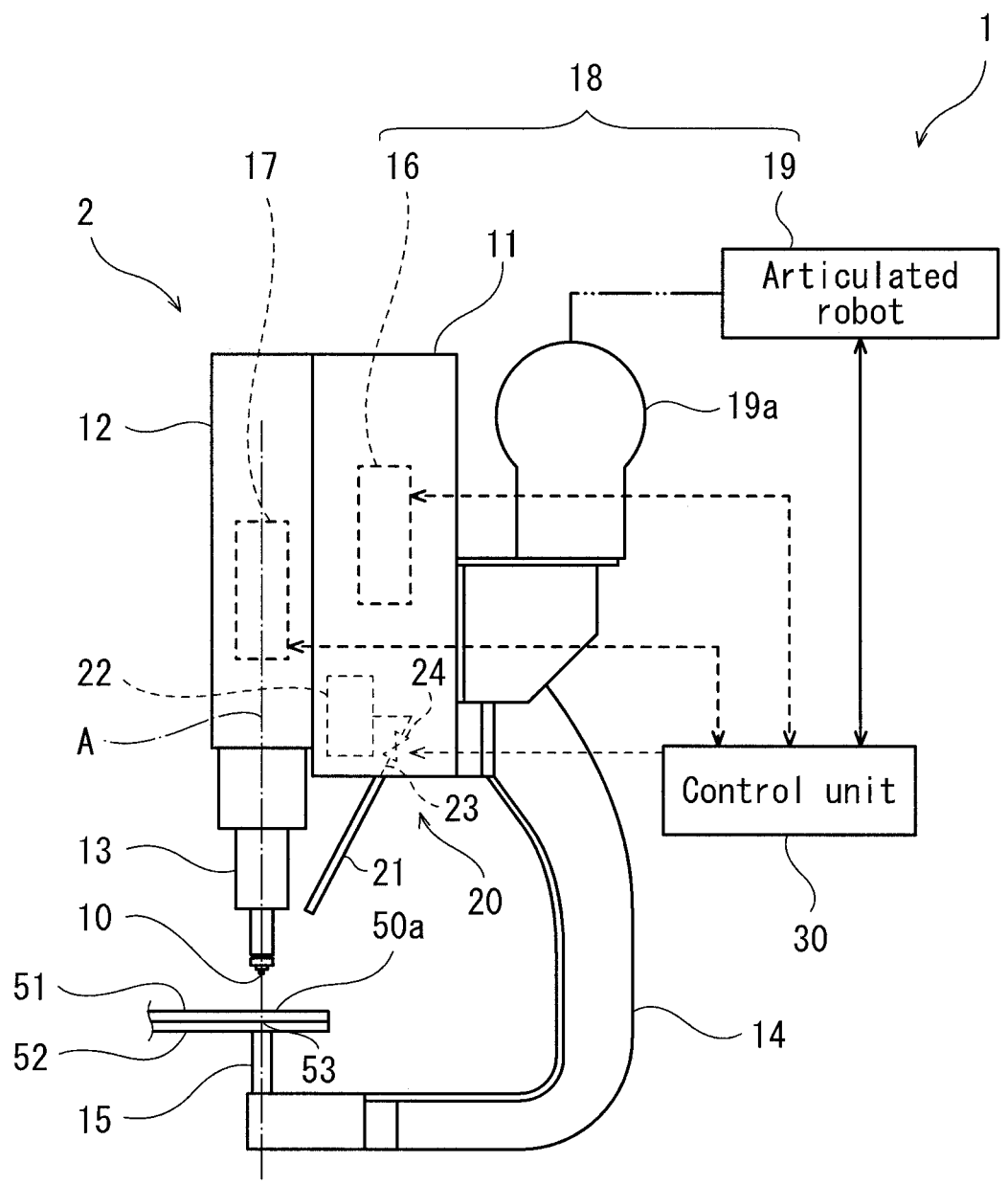
FIG. 1 is a view schematically showing a friction stir spot welding device according to Embodiment 1.

FIG. 1 is a view schematically showing a friction stir spot welding device 1 according to Embodiment 1. In the present embodiment, the friction stir spot welding device 1 is configured to rotate and displace a tool 10 with a substantially cylindrical shape, to perform friction stir spot welding of two steel plates 51, 52 lapped to each other. A plurality of spot welding portions 53 are set or formed in the two steel plates 51, 52. The two steel plates 51, 52 are welded (joined) to each other at the plurality of spot welding portions 53.

(Friction Stir Spot Welding Device)

The friction stir spot welding device 1 includes a base 11, a movable member 12, and a tool retaining member 13. The movable member 12 is mounted on the base 11 so that the movable member 12 is movable in the axis line direction of the tool retaining member 13. The tool retaining member 13 is rotatable around its axis line. The tool retaining member 13 is movable together with the movable member 12 in the axis line direction. The tool 10 is detachably retained at the tip end portion of the tool retaining member 13 and placed coaxially with the tool retaining member 13.

Hereinafter, the axis line of the tool retaining member 13 and the axis line of the tool 10 retained by the tool retaining member 13 will be referred to as "tool axis A". The extension direction of the tool axis A will be referred to as "tool axis direction".

The friction stir spot welding device 1 includes a frame 14 and a support base 15. The frame 14 is secured to the base 11. The frame 14 extends from the base 11 while being curved in a L-shape or a C-shape. The tip end portion of the frame 14 faces the tool 10 in the tool axis direction. The support base 15 is provided at the tip end portion of the frame 14, and supports the steel plates 51, 52 (in particular, spot welding portion 53).

The friction stir spot welding device 1 includes a linear motion driving unit 16 and a rotation driving unit 17. The linear motion driving unit 16 linearly moves the movable member 12 in the tool axis direction. By this linear motion of the movable member 12, the tool 10 is displaced in the tool axis direction with respect to the two steel plates 51, 52 supported by the support base 15. The rotation driving unit 17 rotates the tool retaining member 13 and the tool 10 around the tool axis A. The linear motion driving unit 16 and the rotation driving unit 17 are, for example, electric (electrically powered) motors.

The base 11 is detachably mounted on the tip end portion of an arm 19a of an articulated (multi-joint) robot 19. When the arm 19a operates, the base 11 is displaced with respect to a base (not shown) of the articulated robot 19, and thus the tool 10 is displaced with respect to the steel plates 51, 52. The arm 19a of the articulated robot 19 and the linear motion driving unit 16 serve as a displacement driving unit 18 which displace the tool 10 and the spot welding portion 53 of the steel plates 51, 52, relative to each other.

The friction stir spot welding device 1 includes a cooling device 20 which cools the spot welding portion 53. In the present embodiment, the cooling device 20 includes a nozzle 21 which injects a fluid. The nozzle 21 is connected to a fluid source 22 via a pipe 23. The pipe 23 is provided with a switching unit 24 which performs switching between injection and non-injection of the fluid from the nozzle 21. For example, the fluid source 22 is a tank which stores the fluid in a pressure higher than an atmospheric pressure, and the switching unit 24 is an electromagnetic on/off valve. In this case, when the electromagnetic on/off valve as the switching unit 24 is opened, the fluid is injected from the nozzle 21, while when the electromagnetic on/off valve is closed, the injection of the fluid is stopped (ceased). The nozzle 21 is provided at the base 11. An injection opening of the nozzle 21 is directed toward the tip end portion of the tool retaining member 13. The fluid source 22 may be mounted on the base 11 or may be located to be distant from the base 11 outside the base 11.

The friction stir spot welding device 1 includes a control unit 30 which controls the rotation driving unit 17, the displacement driving unit 18, and the cooling device 20 (in the present embodiment, in particular, the switching unit 24). The control unit 30 may be a single control unit with an integrated function, or a plurality of control units with distributed functions. The control unit 30 includes a processor, a volatile memory, a non-volatile memory, an I/O interface, or the like. In response to a command input via the I/O interface by an input device (e.g., a computer, a teaching pendant or an operation board (control panel)) which is not shown, the processor of the control unit 30 performs calculations (computations) by use of the volatile memory based on an operation program stored in the non-volatile memory, and the control unit 30 communicates with the rotation driving unit 17, the displacement driving unit 18 and the cooling device 20 via the I/O interface.

(Friction Stir Spot Welding Method)

Figure 2:
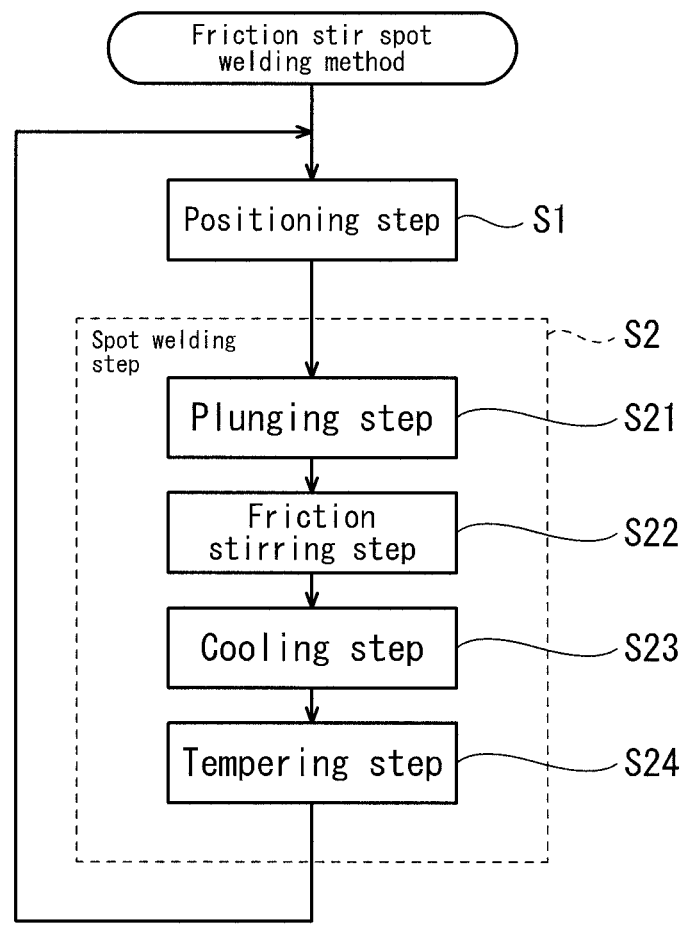
FIG. 2 is a flowchart showing a friction stir spot welding method according to Embodiment 1.

The outline of the flow of the friction stir spot welding method performed by the friction stir spot welding device 1 will be described. FIG. 2 is a flowchart showing the friction stir spot welding method according to Embodiment 1. Initially, the steel plates 51, 52 are positioned with respect to the friction stir spot welding device 1 so that one spot welding portion 53 is supported on the support base 15 and faces the tool 10 in the tool axis direction (positioning step S1). In the positioning step S1, the arm 19a of the articulated robot 19 may be operated to displace the base 11, the steel plates 51, 52 may be displaced with respect to the base 11 by a workpiece transfer device (not shown), or the displacement of the base 11 and the displacement of the steel plates 51, 52 may be combined.

Then, the friction stir spot welding is performed for one spot welding portion 53 supported on the support base 15 (spot welding step S2). In the spot welding step S2 performed once, a plunging step S21, a friction stirring step S22, a cooling step S23, and a tempering step S24 are performed in this order.

When the spot welding step S2 is completed, the process returns to the positioning step S1. The steel plates 51, 52 are positioned with respect to the friction stir spot welding device 1 so that the spot welding portion 53 to be treated next is supported on the support base 15. By repeating the positioning step S1 and the spot welding step S2, the steel plates 51, 52 are welded (joined) to each other at the plurality of spot welding portions 53. The friction stir spot welding method ends when a condition (e.g., predetermined number of spot welding steps S2 are completed, or a maintenance is needed) is met, although this is not shown in detail.

Figure 3A:
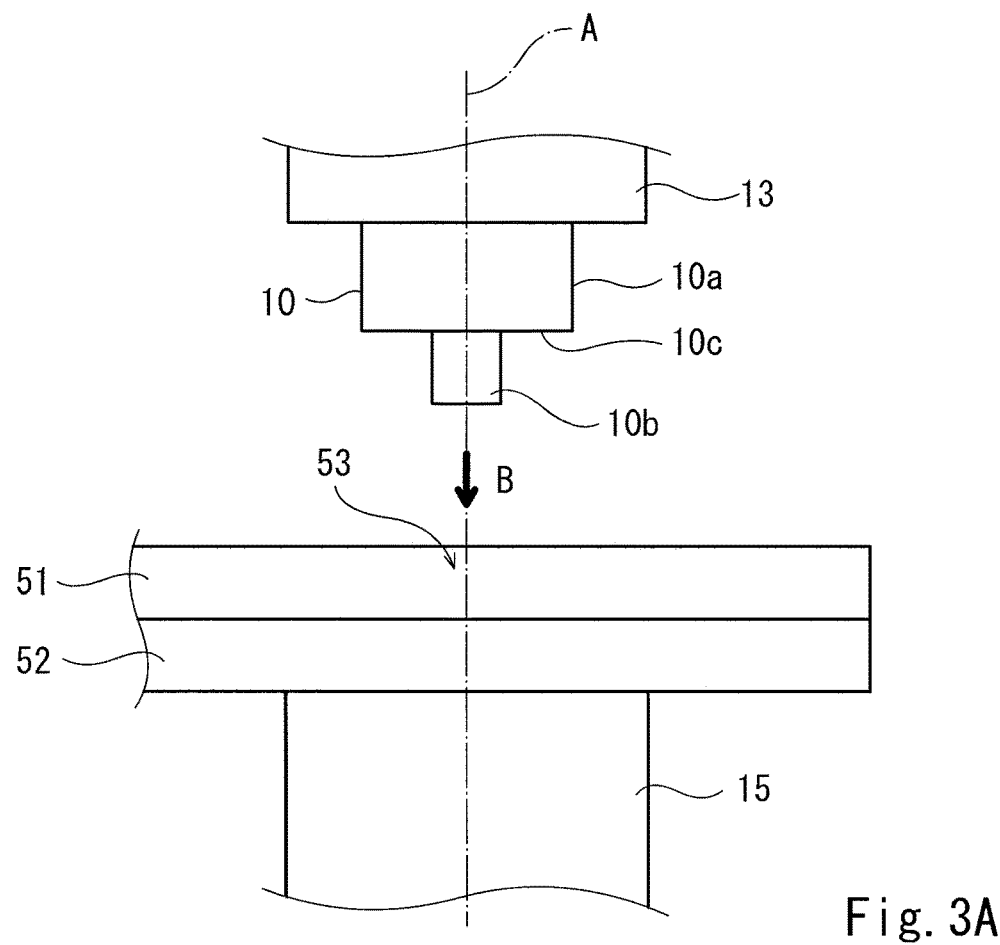
FIG. 3A is a partially enlarged view of FIG. 1, and showing a completion state of a positioning step.

FIG. 3A is an enlarged view of FIG. 1, showing a state in which the positioning step S1 is completed. The two steel plates 51, 52 are supported on the support base 15 in a state in which a plate thickness direction and a lapping direction conform to the tool axis direction. The steel plate 52 is placed on the support surface of the support base 15, and the steel plate 51 is lapped on the steel plate 52. The tool 10 includes a cylindrical tool body 10a and a pin 10b protruding from the center of the tool body 10a. The pin 10b has a diameter smaller than that of the tool body 10a. Hereinafter, a ring-shaped surface which is the end surface in the tool axis direction, of the tool body 10a, and surrounds the pin 10b, will be referred to as "shoulder surface 10c".

Figure 3B:
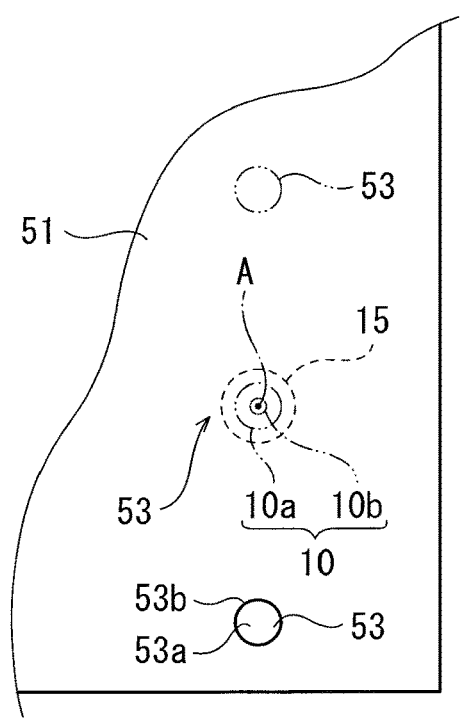
FIG. 3B is a view taken in the direction of arrow B of FIG. 3A, showing steel plates positioned with respect to the friction stir spot welding device, when viewed in a plate thickness direction.

FIG. 3B is a view taken in the direction of arrow B of FIG. 3A, showing a state in which the steel plates 51, 52 are seen in the plate thickness direction (i.e., tool axis direction). Of the three spot welding portions 53 shown in FIG. 3B, the spot welding portion 53 shown at a lower side is the spot welding portion 53 which has gone through the spot welding step S2 (reference symbols 53a, 53b will be discussed later). The spot welding portion 53 shown at a middle side is the spot welding portion 53 which does not go through spot welding step S2 yet, after the positioning step S1 has been completed. The spot welding portion 53 shown at an upper side is the spot welding portion 53 which is a target for which the positioning step S1 and the spot welding step S2 are to be performed, after the spot welding step S2 for, for example, the spot welding portion 53 shown at the middle side has been completed.

<Plunging Step>

Figure 4A:
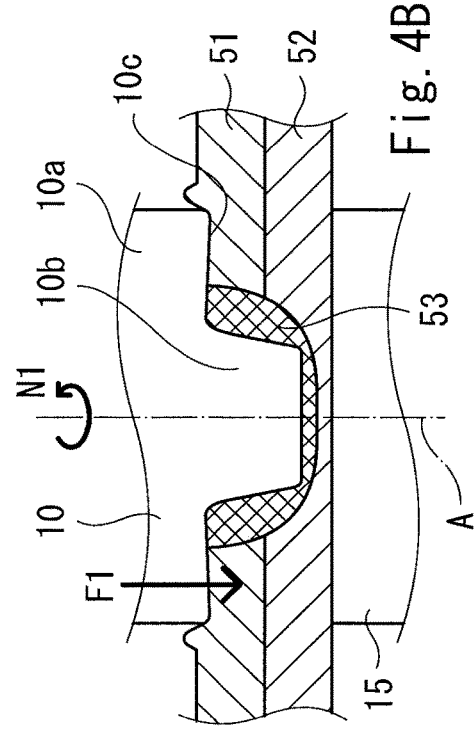
FIG. 4A shows a plunging step.
Figure 4C:
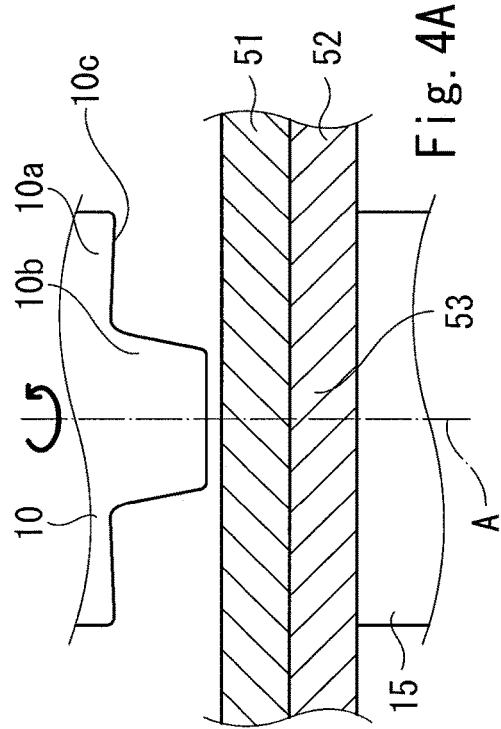
FIG. 4C shows a cooling step.
Figure 4B:
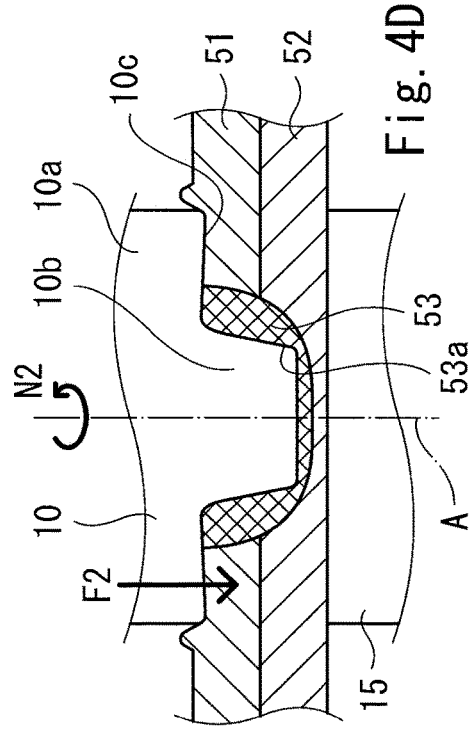
FIG. 4B shows a friction stirring step.

As shown in FIGS. 4A and 4B, in the plunging step S21, the tool 10 is moved in the tool axis direction while rotating the tool 10 around the tool axis A. In this way, the tool 10 is plunged into the steel plates 51, 52.

While the rotating tool 10 is moved, initially, the pin 10b is pressed against the surface (upper surface in FIGS. 4A and 4B), of the steel plate 51. A portion of the steel plate 51 against which the pin 10b is pressed, is softened by friction heat. Since the portion of the steel plate 51 is softened, the pin 10b is further moved in the tool axis direction, from the surface of the steel plate 51. The pin 10b is plunged into the steel plate 51, penetrates the steel plate 51, and reaches the surface (upper surface in FIGS. 4A and 4B) of the steel plate 52. Likewise, a portion of the steel plate 52 is softened by the friction heat. The pin 10b is further moved in the tool axis direction from the surface of the steel plate 52, and is plunged into the steel plate 52.

The tool 10 is moved until the shoulder surface 10c is pressed against the surface (upper surface in FIGS. 4A and 4B) of the steel plate 51. In a state in which the shoulder surface 10c is pressed against the steel plate 51, the pin 10b penetrates the steel plate 51 and is plunged into the steel plate 52. In the present embodiment, the pin 10b does not penetrate the steel plate 52.

<Friction Stirring Step>

As shown in FIG. 4B, in the friction stirring step S22, the tool 10 is pressed against (applies a pressing force to) the spot welding portion 53 while rotating the tool 10, to plasticize the spot welding portion 53 by the friction heat. Since the pin 10b has reached the steel plate 52, the steel plate 51 and the steel plate 52 are kneaded and mixed with each other at the spot welding portion 53 (see cross-hatched region in FIG. 4B).

Note that the "pressing force" (pressure) applied by the tool 10 to the steel plates 51, 52 in the friction stirring step S22 is a force "N" in the tool axis direction (downward direction in the drawings) applied by the tool 10 to the steel plate 51, except otherwise noted.

<Cooling Step>

Figure 5:
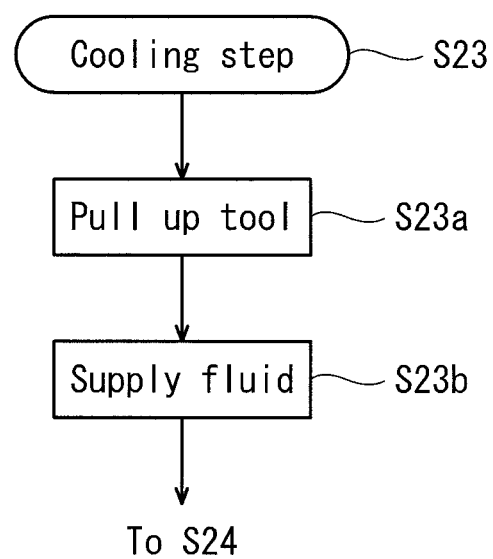
FIG. 5 is a flowchart showing the cooling step according to Embodiment 1.

As shown in FIGS. 4C and 5, in the cooling step S23, the tool 10 is pulled (drawn) up, and thus a space 54 is formed between the tool 10 and the spot welding portion 53 (tool pulling-up step S23a). Then, the fluid is poured (fed) into the space 54 to forcibly cool the spot welding portion 53 (liquid supply step S23b). In the tool pulling-up step S23a, the tool 10 is moved in the tool axis direction and retracted from the spot welding portion 53. At this time, the rotation of the tool 10 may be stopped or may be continued. Further, the tool 10 may be rotated in a direction opposite to the rotation during the plunging step. In the fluid supply step S23b, the cooling device 20 operates. In the present embodiment, the fluid is injected from the nozzle 21. The fluid may be a liquid or a gas. In a case where the fluid is the gas, cooled air or an inactive (inert) gas such as nitrogen or argon can be suitably used. The inactive gas may also be cooled to have a temperature lower than that of ambient air.

As shown in FIG. 4C, a pull-up amount X of the tool 10 is less than a pin-hole depth Y. A pin hole 53a is a plunge indentation of the pin 10b which is formed in the spot welding portion 53 when the pin 10b is pulled up. The pin hole 53a is a circular non-through hole. The pin-hole depth Y is a length in the plate thickness direction (tool axis direction) from the upper edge of the pin hole 53a to the bottom surface of the pin hole 53a. The upper edge of the pin hole 53a corresponds to a portion with which a corner portion formed by the outer peripheral surface of the pin 10b and the shoulder surface 10c made a contact.

In a case where the pull-up amount X is less than the pin hole depth Y, the tip end of the pin 10b stays at a location that is lower than the upper edge of the pin hole 53a. The shoulder surface 10c is apart from and above the steel plate 51. The pin 10b is apart from and above the bottom surface of the pin hole 53a, and a part of the pin 10b is located within the pin hole 53a. A gap is formed between the pin 10b and the upper edge of the pin hole 53a. The fluid injected from the nozzle 21 flows through this gap and reaches the inside of the pin hole 53a. The inner peripheral surface of the pin hole 53a and the inside of the pin hole 53a can be forcibly cooled by this fluid.

<Tempering Step>

Figure 4D:
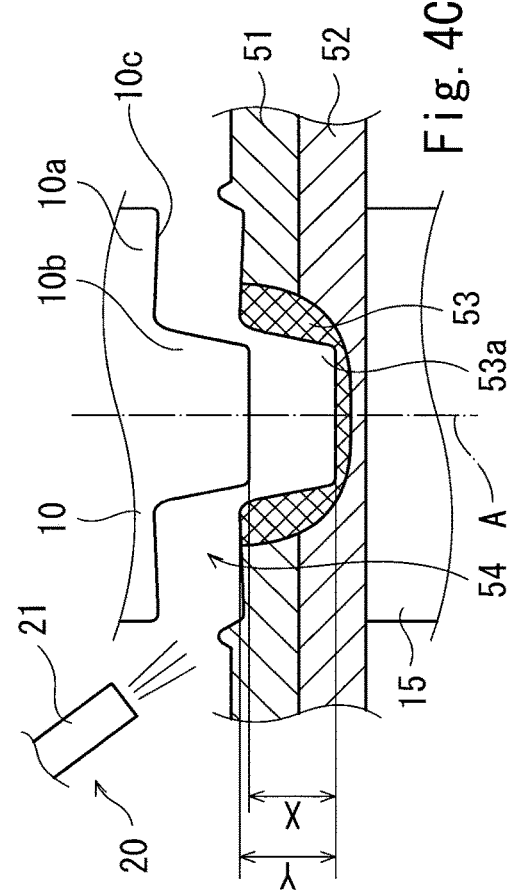
FIG. 4D shows an tempering step.

As shown in FIG. 4D, in the tempering step S24, the tool 10 is pressed against the spot welding portion 53 while rotating the tool 10, to perform tempering of the spot welding portion 53 by the friction heat. In the present embodiment, in the cooling step S23, the tool 10 is pulled (drawn) up from the spot welding portion 53 once. Therefore, in the tempering step S24, again, the tool 10 is moved in the tool axis direction and fitted into the pin hole 53a. In this state, the tool 10 is pressed against (applies a pressing force to) the spot welding portion 53. In this way, the spot welding portion 53 is re-heated by the friction heat. After the re-heating, the tool 10 is pulled (drawn) up. The spot welding portion 53 is cooled. Thus, the spot welding step S2 performed once is completed.

<Temperature, Rotational Speed, Pressing Force>

Figure 6:
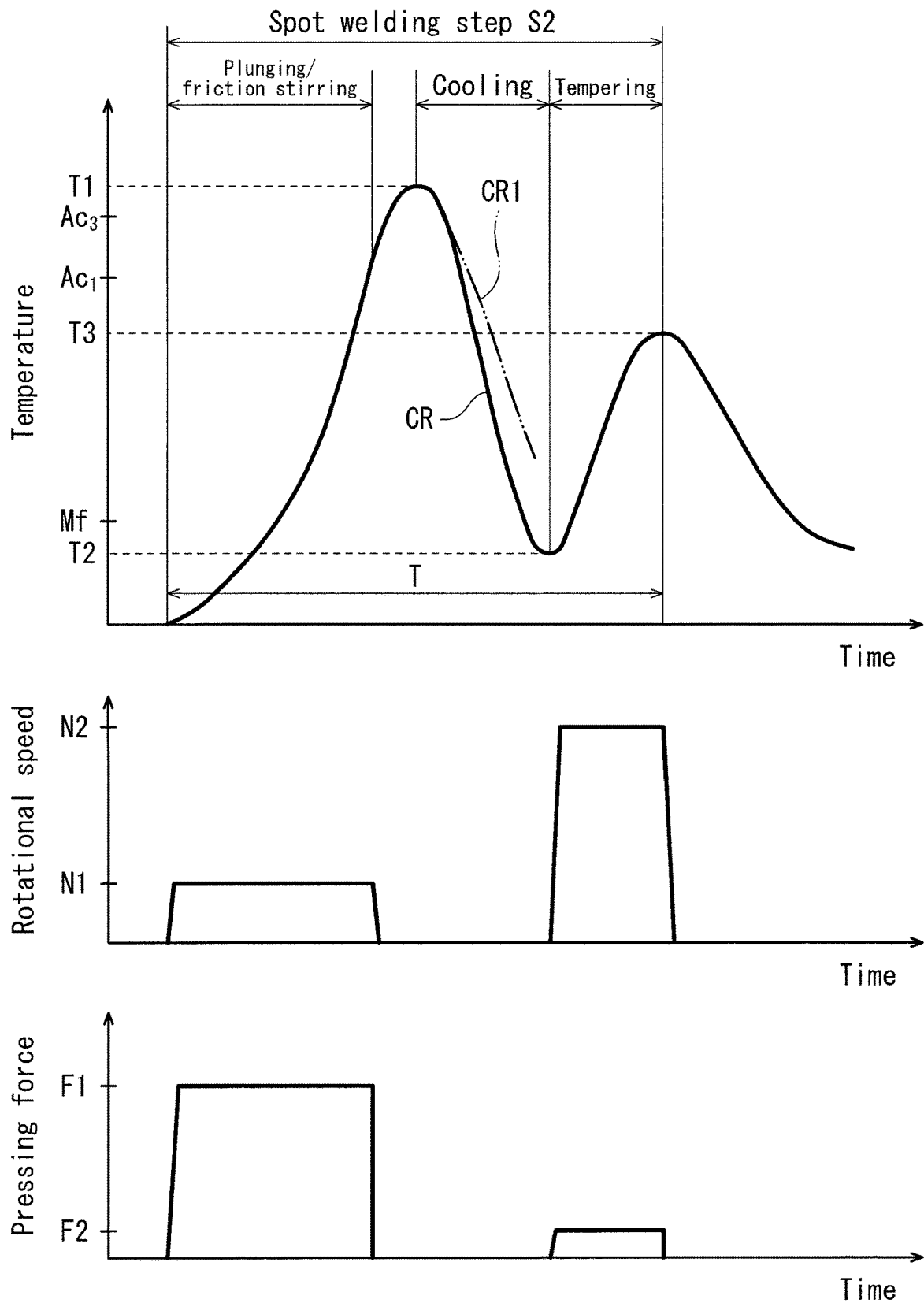
FIG. 6 is a time chart of a spot welding step.

FIG. 6 is a time chart of the spot welding step S2. In FIG. 6, the temperature of the spot welding portion 53 is shown at an upper side, the rotational speed of the tool 10 is shown at a middle side, and the pressing force applied by the tool 10 to the spot welding portion 53 is shown at a lower side.

As shown in FIG. 6, during execution of the friction stirring step S22, the tool 10 is rotated at a first rotational speed N1 and a first pressing force F1 is applied to the spot welding portion 53 (see FIG. 4B in addition to FIG. 6). The first rotational speed N1 and the first pressing force F1 have sufficient values, respectively to allow plasticization to occur in the spot welding portion 53. In the friction stirring step S22, the temperature of the spot welding portion 53 is increased up to a first temperature T1 which is equal to or higher than Ac3 transformation point (austenitic transformation completion temperature during heating), by the friction heat. Thus, in the friction stirring step S22, austenitic transformation occurs in the spot welding portion 53.

Figure 7:
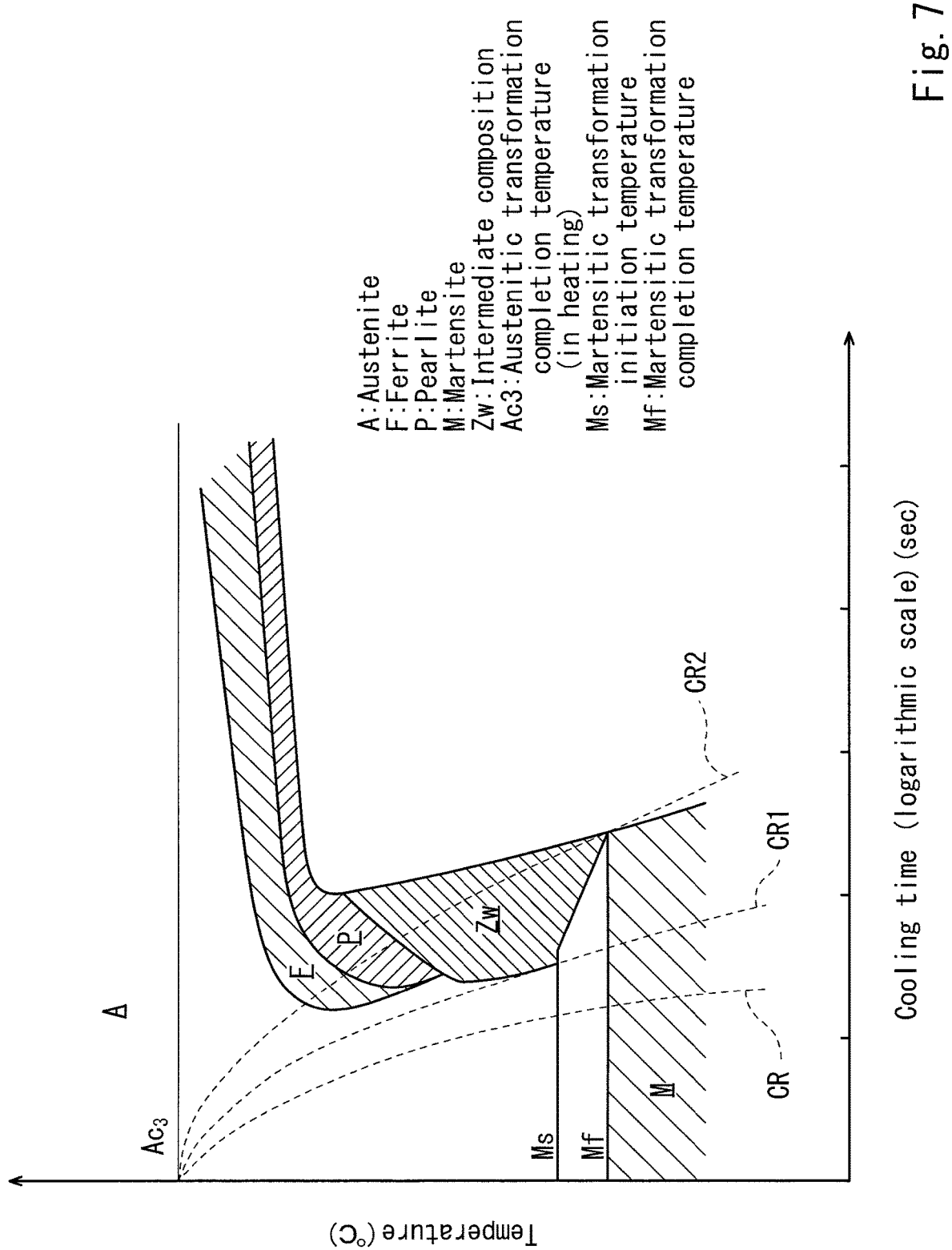
FIG. 7 is a CCT curve of a steel plate.

FIG. 7 is a continuous cooling transformation (CCT) curve of S45C steel which is an example of the steel plates 51, 52. Line CR1 indicates an upper critical cooling rate. Line CR2 indicates a lower critical cooling rate. The upper critical cooling rate CR1 is defined as a minimum (lowest) cooling rate at which a composition having been cooled becomes only martensite. The lower critical cooling rate CR2 is defined as a minimum cooling rate required to cause the martensitic transformation to occur.

In a case where the cooling rate is lower than the lower critical cooling rate CR2, it is possible to prevent occurrence of the martensitic transformation during the cooling. Conventionally, to suppress hardening of the spot welding portion 53, cooling is performed as slowly as possible, after the friction stirring. To effectively suppress the hardening of the spot welding portion 53, it is necessary to set the cooling rate to a value that is close to the lower critical cooling rate CR2. In that case, several minutes are required to return the temperature from the Ac3 transformation point to a room temperature. If the tool 10 remains to be inserted into the steel plates 51, 52, for the purpose of gradual cooling, the process does not move to the positioning step S1 for a next spot welding portion 53 during this period.

In contrast, as shown in FIGS. 6 and 7, in the cooling step S23 of the present embodiment, the spot welding portion 53 is cooled at a cooling rate CR which is equal to or higher than the upper critical cooling rate CR1 (although a case where the cooling rate CR is higher than the upper critical cooling rate CR1, is described, for easier understanding the description, the cooling rate CR may be equal to CR1). For the purpose of rapid cooling, in the cooling step S23, the forcible cooling is performed by use of the cooling device 20, as described above.

In the cooling step S23, the spot welding portion 53 is cooled to a second temperature T2 which is equal to or lower than a martensitic transformation completion temperature Mf. Since the spot welding portion 53 is quickly cooled to the second temperature T2, the spot welding portion 53 is actively hardened, and the martensite can be stably formed in the spot welding portion 53.

In the tempering step S24, the tool 10 is rotated at a second rotational speed N2, and a second pressing force F2 is applied by the tool 10 to the spot welding portion 53 (see FIG. 4D in addition to FIGS. 6 and 7). The pressing force (second pressing force F2) applied to the spot welding portion 53 in the tempering step S24 is less than the pressing force (first pressing force F1) applied to the spot welding portion 53 in the friction stirring step S22. This makes it possible to mitigate an impact applied to the tool 10 when the tool 10 is re-plunged into the steel plates 51, 52. In contrast, the rotational speed (second rotational speed N2) of the tool 10 in the tempering step S24 is higher than the rotational speed (first rotational speed N1) of the tool 10 in the friction stirring step S22. This makes it possible to increase a speed at which the spot welding portion 53 is heated in the tempering step S24 and to reduce the time required for the tempering step S24. For example, the second pressing force F2 is about ⅕ to ⅐ of the first pressing force F1, and the second rotational speed N2 is about three to five times as high as the first rotational speed N1.

In the tempering step S24, the temperature of the spot welding portion 53 is increased to a third temperature T3 which is lower than Ac1 transformation point (temperature at which austenite begins to be generated in the heating), and thereafter is decreased. The third temperature T3 is set to a value within a range of, for example, 550 to 650 degrees C. In the tempering step S24, high-temperature tempering or thermal refining is performed, as an example of the tempering. The temperature of the spot welding portion 53 is decreased by pulling (drawing) out the tool 10. The spot welding portion 53 may be naturally cooled, or the fluid may be injected to the spot welding portion 53 by the cooling device 20 to forcibly cool the spot welding portion 53, as in the cooling step S23. By performing the tempering step S24, reduction of hardness and high toughness of the spot welding portion 53 can be realized. In addition, a residual stress generated in the cooling step S23 can be removed or reduced. Further, even in a case where the austenite composition is left after the cooling step S23, the composition can be stabilized by the tempering.

As described above, in the friction stirring step S22, the cooling step S23, and the tempering step S24, the temperature of the spot welding portion 53, the heating speed (heating rate) for the spot welding portion 53, or the cooling rate for the spot welding portion 53 is required to meet a predetermined condition. The control unit 30 may decide the timing of beginning of each step, the timing of completion (ending) of each step, the timing of insertion of the tool 10, or the timing of pulling-up of the tool 10, while monitoring the detection value of a temperature sensor which detects the temperature of the spot welding portion 53.

By conducting an experiment many times while adjusting the rotational speeds and the pressing forces, the timings of beginning of the steps and the timings of completion (ending) of the steps, with which the temperature meets the above-described condition can be found in advance. Therefore, the control unit 30 may give an operation command to each of the displacement driving unit 18 and the rotation driving unit 17 so that the displacement driving unit 18 and the rotation driving unit 17 operate or stop, according to the timings found in advance, without inputting the temperature information.

<Spot Welding Portion After Completion of Step>

Figure 8:
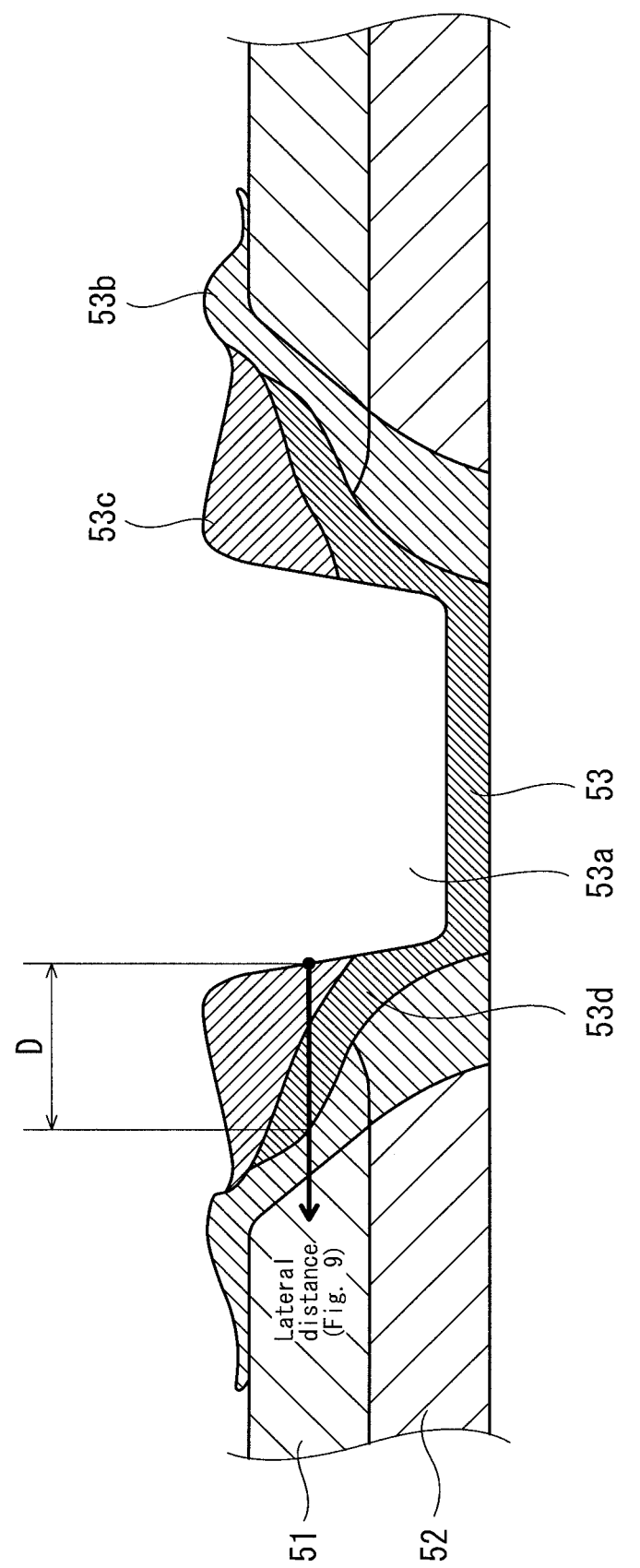
FIG. 8 is a view showing a completion state of the spot welding step.

FIG. 8 is a cross-sectional view of the spot welding portion 53 for which the spot welding step S2 is completed (specifically, the cross-sectional view of the spot welding portion 53 shown at the lower side of FIG. 3B). When the spot welding step S2 is completed, the pin hole 53a is formed in the spot welding portion 53. The pin hole 53a is the plunge indentation of the pin 10b (see FIG. 3A), and is the circular non-through hole. A ring-shaped protruding portion 53b is formed in the surface (upper surface in FIG. 8) of the steel plate 51, at a location with which the outer edge portion of the shoulder surface 10c (see FIG. 3A) made a contact.

In the inner region of the spot welding portion 53, a high-temperature heated region (zone) 53c which was heated at a temperature higher than the third temperature T3 in the tempering step S24, is formed at a location that is inward of the protruding portion 53b and is in the vicinity of the upper surface of the steel plate 51. A tempered region (zone) 53d is formed on the outer side of the high-temperature heated region 53c. As described above, the temperature of the tempered region 53d is increased up to the third temperature T3 in the tempering step S24, to realize reduction of hardness and high toughness. The tempered region 53d is in contact with an unaffected base metal interface of the steel plates 51, 52. Since the tempered region 53d with reduced hardness and increased toughness is in contact with the interface, joint strength, in particular, peel-off strength can be improved, as will be described later.

While the tool 10 was pressed against the spot welding portion 53 in the tempering step S24, the high-temperature heated region 53c was locally applied with a high pressing force, and became a main heat generating source of the friction heat. The tool 10 and the spot welding portion 53 are thermally contracted in the cooling step S23. In particular, a volume of the spot welding portion 53 changes due to a change in the composition. It is presumed that the high-temperature heated region 53c of FIG. 8 was generated because the amount of contraction of the tool 10 was less than the amount of contraction (including thermal contraction and change in the composition) of the spot welding portion 53 (pin hole 53a) in the cooling step S23. In other words, it is presumed that the pressing force applied by the shoulder surface 10c to the steel plate 51 in the tempering step S24 became relatively larger, and thereby great friction heat was generated in the surface of the steel plate 51. By making use of such a difference between the amount of contraction of the tool 10 and the amount of contraction of the spot welding portion 53, and by choosing a thermal expansion rate of the tool 10, the location of the friction heat generating source can be changed.

(Operation)

Figure 9:
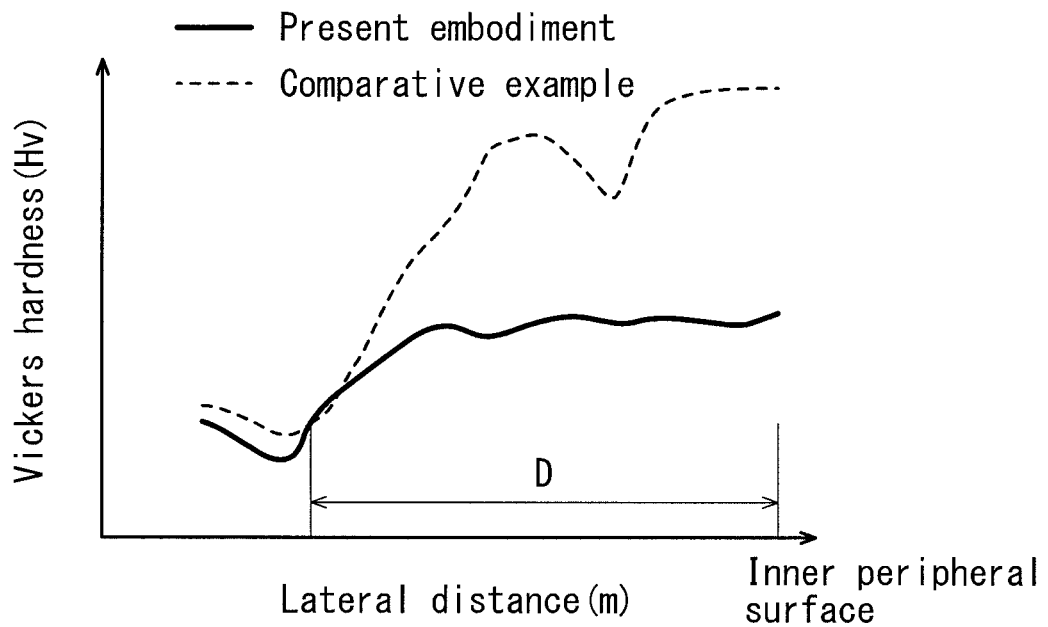
FIG. 9 is a graph showing a hardness distribution of a spot welding portion.
Figure 10:
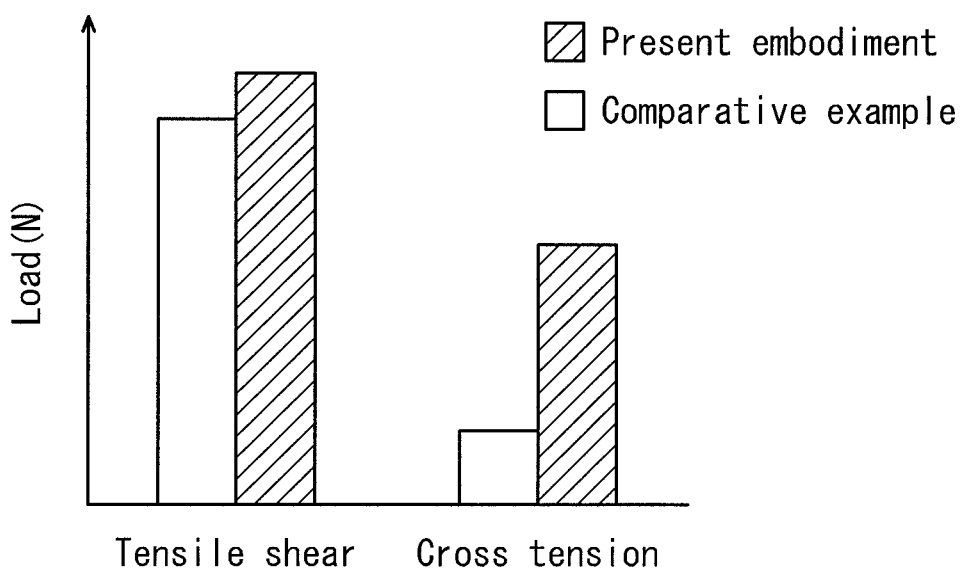
FIG. 10 is a graph showing joint strength of the spot welding portion.
Figure 11:
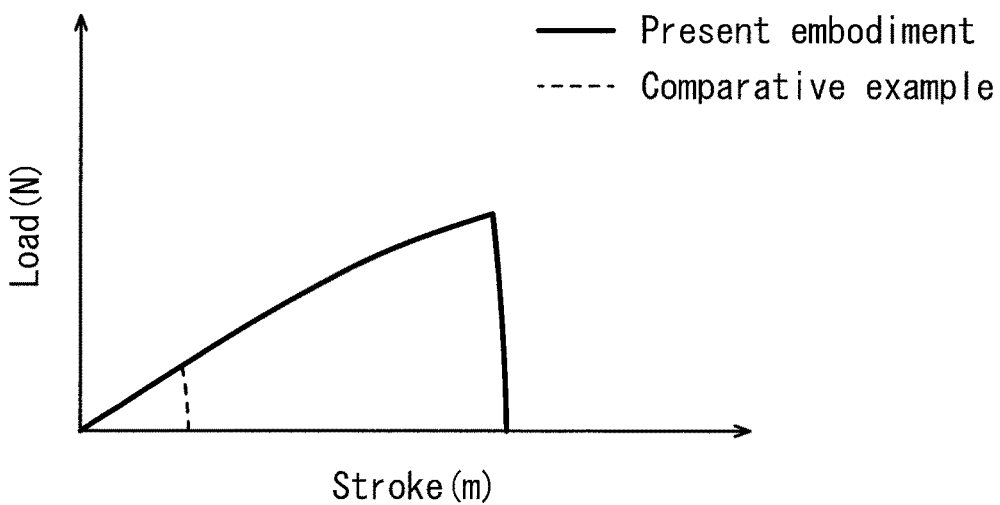
FIG. 11 is a load-stroke diagram in a cross tension test conducted for the spot welding portion.

FIGS. 9 to 11 are graphs showing characteristics of a joint of the steel plates manufactured by use of the friction stir spot welding method of the present embodiment. A joint manufactured without performing the cooling step S23 and the tempering step S24 is shown as a comparative example.

FIG. 9 shows a hardness distribution of the spot welding portion 53 and a region which is close to the spot welding portion 53. A horizontal (lateral) axis indicates a distance (see FIG. 8 in addition to FIG. 9) in a lateral direction (direction perpendicular to the plate thickness direction) from the inner peripheral surface of the pin hole 53a, and a vertical (longitudinal) axis indicates Vickers hardness. In a portion which is away at a first distance D or more, from the inner peripheral surface of the pin hole 53a, there is no great difference in hardness between the present embodiment and the comparative example. It is considered that this portion was an unaffected base metal (this portion was not stirred in the spot welding step S2 and noticeable composition change did not occur in this portion because input of the friction heat to this portion was less). On the other hand, regarding a portion which is within the first distance D from the inner peripheral surface of the pin hole 53a, it is considered that this portion was stirred, or thermally affected by the friction heat and resulted in, for example, the change in the composition, even though this portion was not actually stirred. The hardness of this portion of the present embodiment is lower than that of this portion in the comparative example.

FIG. 10 shows the joint strength. FIG. 10 shows a result of a tensile shear test at a left side and shows a result of a cross tension test at a right side. A vertical axis indicates a load required for a fracture. FIG. 11 is a load-stroke diagram in the cross tension test. As shown in FIG. 10, in the present embodiment, the tensile shear strength and the peel-off strength are higher than those in the comparative example.

In particular, the peel-off strength can be significantly improved. As can be seen from FIG. 11, elongation of the spot welding portion 53 before the fracture occurs is greater in the present embodiment than in the comparative example.

In the present embodiment, after the spot welding portion 53 is plasticized by the friction heat, the spot welding portion 53 is quenched (hardened) by the cooling and then tempered by the tool 10. In this way, reduction of hardness and high toughness of the spot welding portion 53 can be realized. As a result, the joint strength can be improved.

Although the tempering step S24 is required, the tool 10 used in the plunging step S21 and the friction stirring step S22 is used in the tempering step S24. Therefore, the plunging step S21, the friction stirring step S22, and the tempering step S24 can proceed smoothly in turn. In particular, in the present embodiment, the forcible cooling is performed after the plasticization, to make the cooling time as short as possible. This makes it possible to reduce the time required for the whole process. Therefore, productivity of the joint is high. Time T (see FIG. 6) required for the spot welding step S2 can be reduced to about several seconds.

In the cooling step S23, the spot welding portion 53 is cooled at the cooling rate CR which is equal to or higher than the upper critical cooling rate CR1 of the steel plates 51, 52. Therefore, the martensite can be stably formed in the spot welding portion 53, and high joint strength can be maintained. In addition, since the cooling time is reduced, productivity of the joint can be improved.

In the cooling step S23, the temperature of the spot welding portion 53 is decreased to a temperature which is equal to or lower than the martensitic transformation completion temperature Mf of the steel plates 51, 52. Therefore, the martensite can be stably formed in the spot welding portion 53, and high joint strength can be kept.

In the present embodiment, the cooling step S23 includes the tool pulling-up step S23a and the fluid supply step S23b. In the tool pulling-up step S23a, the pull-up amount X of the tool 10 is set to be less than the pin-hole depth Y. After the cooling step S23, the tempering step S24 is performed. In a case where the pull-up amount X of the tool 10 is set to be less than the pin-hole depth Y, a position deviation (position gap) between the tool 10 and the pin hole 53a can be reduced. Therefore, it becomes possible to prevent a situation in which the tool 10 undesirably collides with the steel plate 51 while the tool 10 is re-pressed against the spot welding portion 53.

The rotational speed (second rotational speed N2) of the tool 10 in the tempering step S24 is set to be higher than the rotational speed (first rotational speed N1) of the tool 10 in the friction stirring step S22. This makes it possible to increase the speed of re-heating in the tempering step S24, and to reduce the time required for the tempering step S24.

Figure 12:
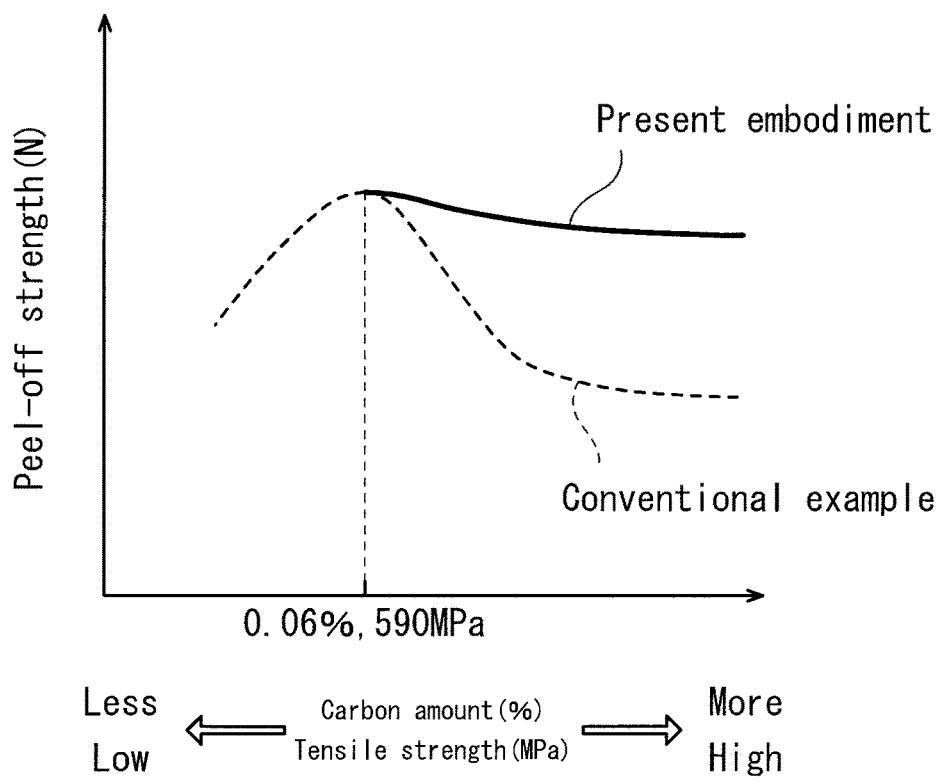
FIG. 12 is a graph showing a relation between carbon content/tensile strength and joint strength of the steel plate.

FIG. 12 is a graph showing a relation between the carbon content or tensile strength of the steel plate and the peel-off strength of the joint manufactured by the friction stir spot welding. A broken line in FIG. 12 indicates a case where the cooling step and the tempering step performed in the present embodiment are not performed. In this case, when the carbon content is 0.06% and the tensile strength is 590 MPa, the peel-off strength can be effectively improved. In a case where the carbon content is less than 0.06%, the quenching hardness of the base metal is low, and the peel-off strength cannot be effectively improved. In a case where the carbon content is more than 0.06%, the spot welding portion 53 easily becomes hard and brittle after the friction stirring step, due to the increased hardenability. This results in reduced peel-off strength. In the present embodiment, by performing the tempering step S24, the toughness of the spot welding portion 53 can be increased. Therefore, the present embodiment is suitably applied to spot welding (spot joining) of the steel plates with a carbon content of 0.06% or more or tensile strength of 590 MPa or higher. In this case, as indicated by a solid line of FIG. 12, the peel-off strength can be improved by realizing reduction of hardness and high toughness of the spot welding portion 53. As a result, the relation between the carbon content/tensile strength and the peel-off strength of the joint in a conventional example can be improved.

Embodiment 2

Figure 13:
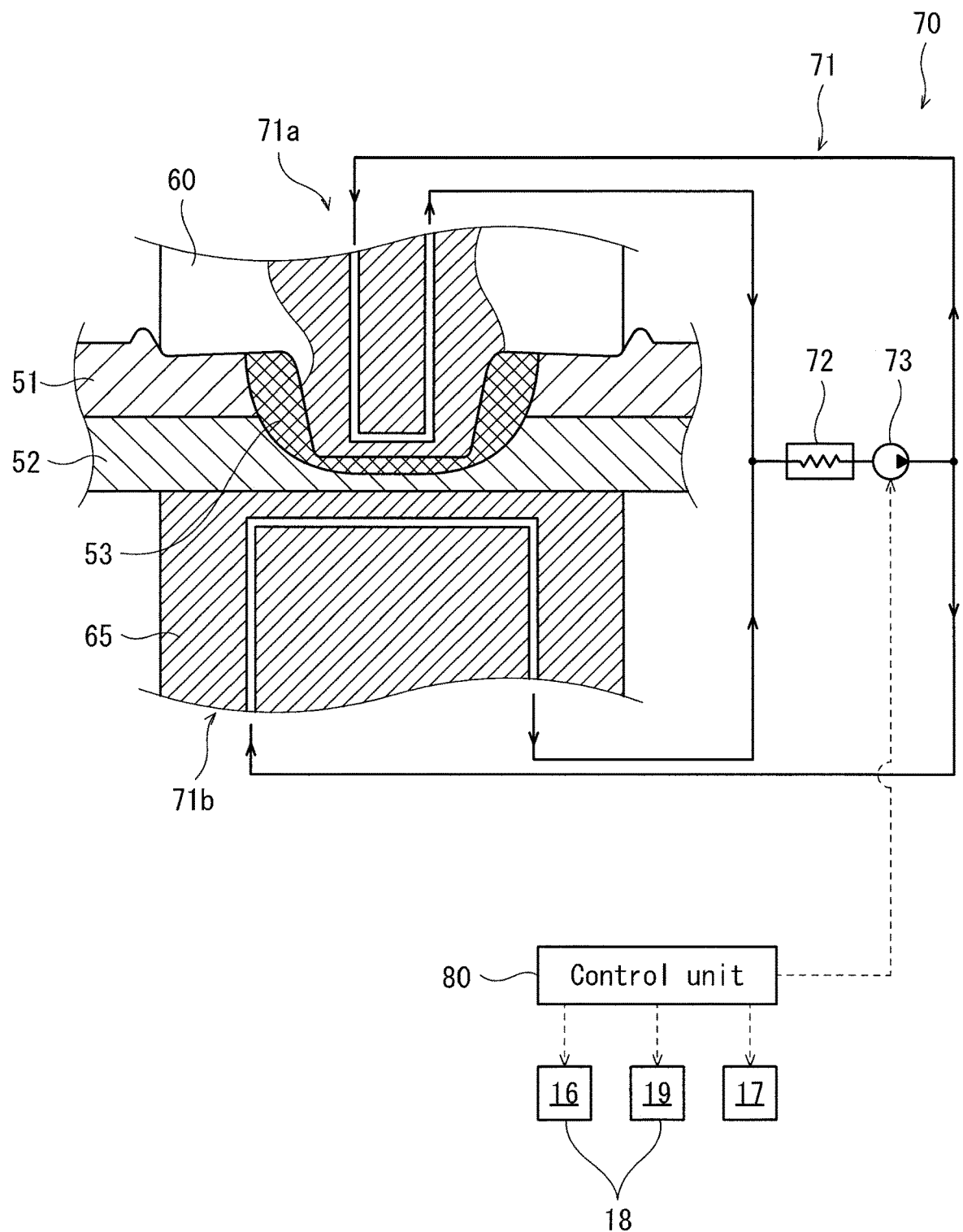
FIG. 13 is a view showing a cooling device of a friction stir spot welding device according to Embodiment 2, and a cooling step according to Embodiment 2.

FIG. 13 shows Embodiment 2. Embodiment 2 is different from Embodiment 1 in the configuration of a cooling device 70 and the procedure of a cooling step S72. Hereinafter, regarding Embodiment 2, this difference will be mainly described.

As shown in FIG. 13, the cooling device 70 includes a cooling medium passage 71 through which a cooling medium flows, a cooler 72 which cools the cooling medium, and a cooling medium feeding unit 73 which feeds the cooling medium with a pressure. The cooler 72 may be a heat exchanger (or heat radiator) which takes heat from the cooling medium by the heat exchange with ambient air. The cooling medium passage 71 may be a closed or open circuit. The cooling medium is preferably a liquid, but is not limited. A control unit 80 controls the cooling device 70 (in particular, the cooling medium feeing unit 73).

The cooling medium passage 71 includes at least one of a first cooling medium passage 71a formed to pass through the inside of a tool 60 and configured to flow the cooling medium therethrough, and a second cooling medium passage 71b formed to pass through the inside of a support base 65 and configured to flow the cooling medium therethrough. For example, a case where the cooling medium passage 71 includes the first cooling medium passage 71a and the second cooling medium passage 71b will be described. In this case, the first cooling medium passage 71a and the second cooling medium passage 72b may be connected in parallel with the cooler 72. In brief, the cooling medium passage 71 may branch into a passage leading to the tool 60 and a passage leading to the support base 65 at a location that is downstream of the cooler 72 and these two passages may be joined together at a location that is downstream of the tool 60 and the support base 65 and upstream of the cooler 72.

In the present embodiment, the overall flow of the friction stir spot welding method is shown in FIG. 2. However, the cooling step is different from that of FIGS. 4C and 5. As shown in FIG. 13, in the cooling step S72 of the present embodiment, the tool 60 is not pulled (drawn) out, and the rotational speed of the tool 60 is reduced, or the rotation of the tool 60 is stopped. The cooling medium feeding unit 73 operates and the cooling medium is circulated through the cooling medium passage 71. Thus, the cooling medium flowing through the inside of the tool 60 and the inside of the support table 65 takes the heat from the spot welding portion 53, and the spot welding portion 53 is forcibly cooled. The cooling medium which has taken the heat from the spot welding portion 53 and has an increased temperature, is cooled by the cooler 72, and the cooled cooling medium is supplied to the tool 60 and the support base 65.

In this case, the pulling-up of the tool 60 and the re-fitting of the tool 60 can be omitted. Therefore, the time required for the spot welding step S2 can be reduced.

Modified Example

The present invention is not limited to the above-described embodiments, and the configurations may be changed, added or deleted. For example, the forcible cooling in the cooling step is not essential, and natural cooling may be performed so long as a desired cooling rate can be obtained. In the case of the natural cooling, it is necessary to pull-up the tool from the steel plates. In that case, the pull-up amount of the tool is set to be less than the pin-hole depth. In this way, break of the tool in the tempering step can be prevented. Further, the number of the steel plates which are lapped to each other and spot-welded to each other may be three or more.

REFERENCE SIGNS LIST 1 friction stir spot welding device
10, 60 tool
17 rotation driving unit
18 displacement driving unit
20, 70 cooling device
30, 80 control unit
51, 52 steel plate
53 spot welding portion
54 space
S22 friction stirring step
S23 cooling step
S23a tool pulling-up step
S24 tempering step
CR1 upper critical cooling rate
Mf martensitic transformation completion temperature
N1 first rotational speed (rotational speed of tool in friction stirring step)
N2 second rotational speed (rotational speed of tool in tempering step)
X pull-up amount of tool
Y pin hole depth

The invention claimed is:

1. A method of performing friction stir spot welding of a plurality of steel plates, the method comprising the steps of:
   friction stirring a spot welding portion of the plurality of steel plates by pressing a tool against the spot welding portion while rotating the tool, to plasticize the spot welding portion by friction heat;
   cooling the spot welding portion to cause martensitic transformation to occur in the spot welding portion, after the step of friction stirring the spot welding portion; and
   tempering the spot welding portion by the friction heat by re-pressing the tool against the spot welding portion while rotating the tool, after the step of cooling the spot welding portion.

2. The method of performing friction stir spot welding according to claim 1, wherein in the step of cooling the spot welding portion, the spot welding portion is cooled at a cooling rate which is equal to or higher than an upper critical cooling rate of the plurality of steel plates.

3. The method of performing friction stir spot welding according to claim 1, wherein in the step of cooling the spot welding portion, a temperature of the spot welding portion is decreased to a temperature which is equal to or lower than a martensitic transformation completion temperature of the plurality of steel plates.

4. The method of performing friction stir spot welding according to claim 1,
   wherein the step of cooling the spot welding portion includes pulling up the tool to form a space between the tool and the spot welding portion, and
   wherein the tool is pulled up so that a pull-up amount of the tool is less than a pin hole depth.

5. The method of performing friction stir spot welding according to claim 1, wherein in the step of tempering the spot welding portion, a temperature of the spot welding portion is increased up to 550 to 650 degrees C. and then decreased.

6. The method of performing friction stir spot welding according to claim 5, wherein in the step of tempering the spot welding portion, a rotational speed of the tool is set to be higher than a rotational speed of the tool in the step of friction stirring the spot welding portion.

7. The method of performing friction stir spot welding according to claim 1, wherein the plurality of steel plates have a carbon content of 0.06% or more, or a tensile strength of 590 MPa or higher.

8. A device that performs friction stir spot welding of a plurality of steel plates, the device comprising:
   a displacement driving unit that displaces a spot welding portion of the plurality of steel plates and a tool relative to each other;
   a rotation driving unit that rotates the tool; and
   a control unit including a processor and a memory, the memory storing an operation program causing the processor to:
      perform a friction stirring step, in which the control unit causes the displacement driving unit and the rotation driving unit to operate to press the tool against the spot welding portion while rotating the tool to plasticize the spot welding portion of the plurality of steel plates by friction heat,
      perform a cooling step that cools the spot welding portion, in which the control unit causes at least one of the displacement driving unit and the rotation driving unit to pull up the tool or reduce a rotational speed of the tool, and
      perform a tempering step that tempers the spot welding portion, in which the control unit causes the displacement driving unit and the rotation driving unit to re-press the tool against the spot welding portion while simultaneously rotating the tool.

* * * * *